United States Patent [19]

Iwagaya

[11] Patent Number: 5,099,433
[45] Date of Patent: Mar. 24, 1992

[54] HIGH-SPEED MACHINING SYSTEM

[75] Inventor: Takashi Iwagaya, Hachioji, Japan

[73] Assignee: Fanuc Ltd., Minamitsuru, Japan

[21] Appl. No.: 733,064

[22] Filed: Jul. 17, 1991

Related U.S. Application Data

[63] Continuation of Ser. No. 342,534, filed as PCT/JP88/00892, Sep. 3, 1988, abandoned.

[30] Foreign Application Priority Data

Sep. 10, 1987 [JP] Japan .................. 62-226792

[51] Int. Cl.$^5$ ........................... G06F 15/46
[52] U.S. Cl. ........................ 364/474.31; 364/474.23; 364/474.29; 318/573
[58] Field of Search .............. 364/474.23, 474.24, 364/474.28, 474.29, 474.3, 474.31; 318/560, 573

[56] References Cited

U.S. PATENT DOCUMENTS

| | | | |
|---|---|---|---|
| 4,061,907 | 12/1977 | Okamoto et al. ................ | 318/573 |
| 4,214,309 | 7/1980 | Koide et al. .................... | 364/474.31 |
| 4,446,525 | 5/1984 | Hoch et al. ..................... | 364/474.23 |
| 4,484,286 | 11/1984 | Nagamine et al. ............. | 364/474.23 |
| 4,591,968 | 5/1986 | Nozawa et al. ................ | 364/474.23 |
| 4,829,419 | 5/1989 | Hyatt ............................. | 364/188 |
| 4,835,700 | 5/1989 | Tanaka et al. .................. | 364/474.23 |
| 4,903,213 | 2/1990 | B,ühler et al. .................. | 364/474.31 |
| 4,965,737 | 10/1990 | Iwagaya ......................... | 364/474.22 |

*Primary Examiner*—Jerry Smith
*Assistant Examiner*—Paul Gordon
*Attorney, Agent, or Firm*—Staas & Halsey

[57] ABSTRACT

A high speed machining system for machining a curve while interpolating pulses at a high speed is disclosed, wherein data of a curve (1a) to be machined by instructions from a custom macro (1b) is divided into data representing fine amounts of movement by a user through a custom macro instruction means (2) and stored in a memory (3) as machining data before machining. The data representing fine amounts of movement is pulse interpolated by a pulse interpolator (4) for machining, whereby a cam curve and the like can be machined a high speed without the need for an automatic program creation unit and the like.

3 Claims, 3 Drawing Sheets

HIGH-SPEED MACHINING SYSTEM

This application is a continuation of Application Ser. No. 07/342,534, filed as PCT/JP88/00892, Sep. 3, 1988, now abandoned.

BACKGROUND OF THE INVENTION

The present invention relates to a high speed machining system for machining a curve at a high speed while interpolating pulses. More specifically, the present invention is directed to a high speed machining system in which data of a curve to be machined by instructions from a custom macro is divided into data representing fine amounts of movement for effecting a pulse interpolation at a high speed.

A numerical control apparatus is required to machine a complex curve such as a cam curve and the like at a high speed. The machining must be effected at high speed while periodically performing pulse interpolation at intervals of a few milliseconds.

Although a curve must be pulse-interpolated at high speed for the machining, it is difficult for a processor of the numerical control apparatus to effect this high speed pulse-interpolation because the processor must carry out many other tasks in addition to the pulse-interpolation.

To effect high speed pulse-interpolation, a machining system has been used in which an interface, referred to as a high speed remote buffer, is provided at a numerical control apparatus side. Data divided to represent fine amounts of movement by an automatic program creation unit, is transferred therethrough at high speed to carry out the machining.

This machining system, however, requires an automatic program creation unit and interface and the like, and is complex and expensive. Further, the machining system has a drawback in that the pulse distribution is restricted by the transmission speed of a remote buffer and the like.

SUMMARY OF THE INVENTION

An object of the present invention is to solve the above problems and to provide a high speed machining system in which data of a curve to be machined by instructions from a custom macro is divided into data representing fine amounts of movement, for effecting pulse interpolation at high speed.

To solve the above problems, in accordance with the present invention, there is provided a high speed machining system for machining a curve while interpolating pulses at high speed, comprising the steps of creating data for machining said curve by instructions from a custom macro, dividing the data for machining the curve into data representing fine amounts of movement before machining, and pulse-interpolating the fine amounts of movement for machining.

The data of a curve to be machined by instructions from the custom macro is divided into data representing fine amounts of movement by a custom macro operation means and stored before machining. Data and data representing fine amounts of movement is read by an input code of a numerical control apparatus to carry out the machining, while effecting pulse interpolation.

DESCRIPTION OF THE PREFERRED EMBODIMENTS

An embodiment of the present invention will be hereinafter described in detail with reference to the drawings.

Figure 1:
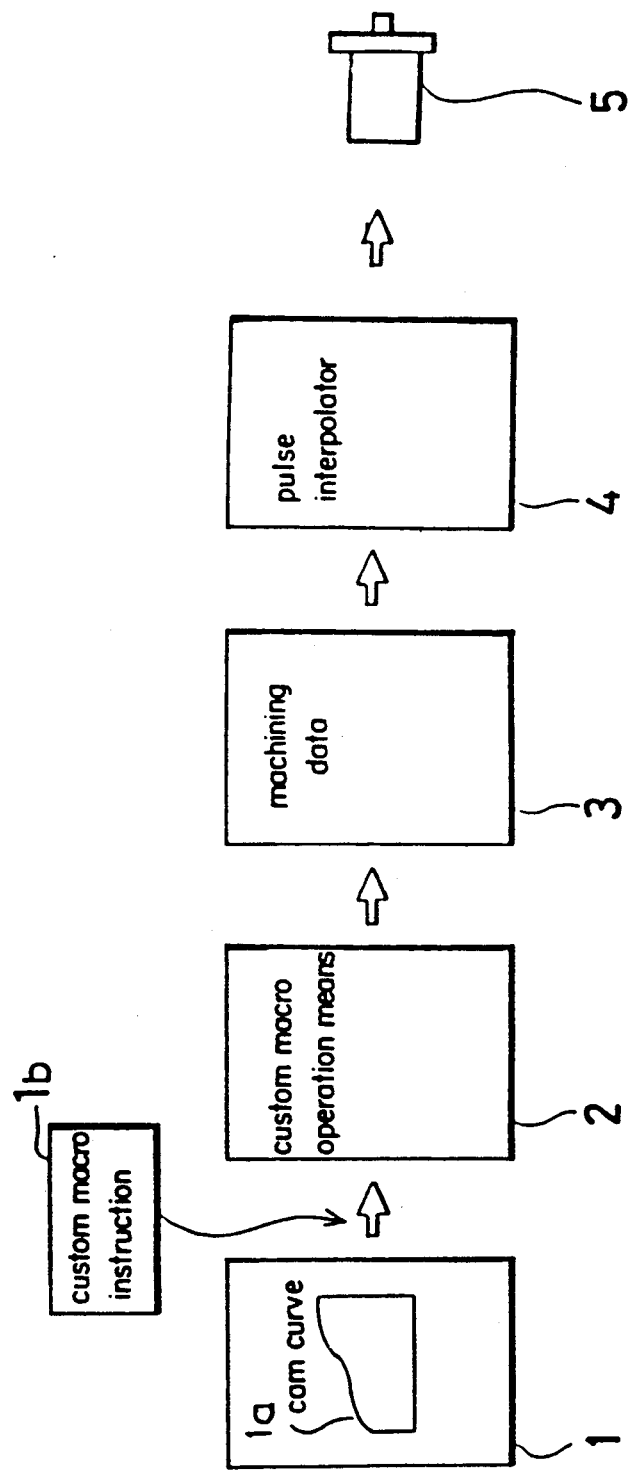
FIG. 1 is a block diagram according to an embodiment of the present invention.

FIG. 1 is a block diagram of an embodiment of the present invention, wherein 1 designates a drawing illustrating a complex curve such as a cam curve 1a. A user creates a custom macro instruction 1b using a custom macro instruction means. If, however, the instruction is executed as it is, pulses can not be distributed at high speed, and thus high speed machining cannot be effected. In FIG. 1, 2 designates a custom macro operation means for creating and dividing data of the curve from 1 into data representing fine amounts of movement before machining, 3 designates a memory for storing machining data, and data divided to represent fine amounts of movement, 4 designates a pulse interpolator for reading the divided data representing fine amounts of movement using an input code of a numerical control apparatus and executing a pulse distribution, and 5 designates a servomotor controlled by the pulse distribution instruction.

Figure 2:
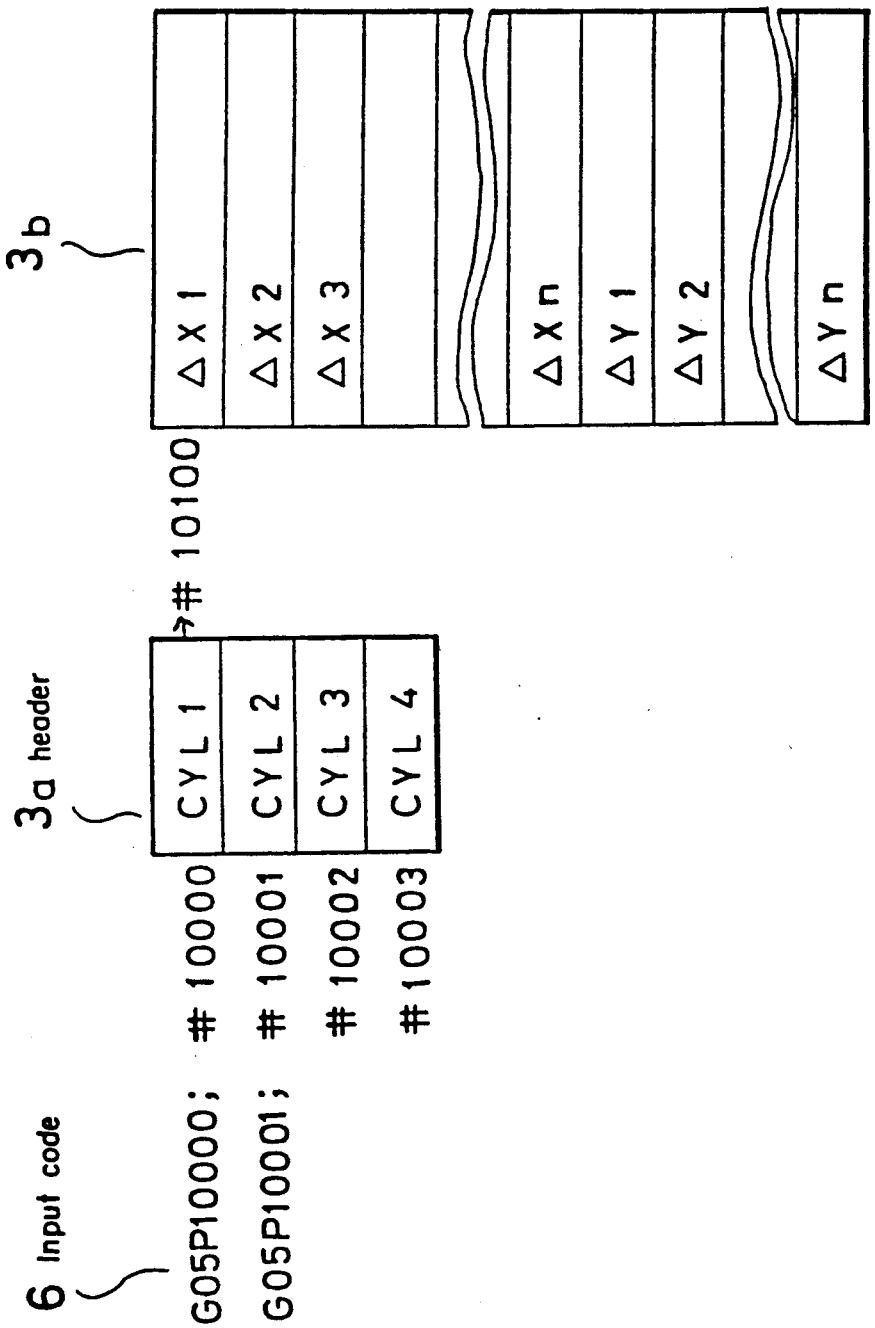
FIG 2 is a diagram of an arrangement of data representing fine amounts of movement and input code.

Next, an arrangement of data representing fine amounts of movement and the input code will be described. FIG. 2 shows the arrangement of data representing fine amounts of movement and the input code. The numeral 3a designates a header indicating a location where data is stored and 3b designates data representing fine amounts of movement As shown in FIG. 2, a header of machining data is stored in an address indicated by "#10000" and an address "#10100" holding the machining data is stored in the header. A curve indicated by the custom macro is divided as shown by headers "CYL1", "CYL2", and "CYL3" and these divided portions are further divided into fine amounts of movement and stored in addresses shown by the headers. The fine amounts of movement actually obtained by a pulse distribution effected every two milliseconds are represented by "$\Delta X1$", "$\Delta X2$", ... "$\Delta Xn$", "$\Delta Y1$", "$\Delta Y2$", "$\Delta Y3$" ... "$\Delta Yn$". The above data is created before machining. In FIG. 2, 6 designates the input code for reading the header 3a. A sequential pulse distribution of the data representing fine amounts of movement indicated by the header enables the pulse distribution to be executed at high speed. More specifically, a header "CYL1" at an address "#10000" corresponding to "10000" is read in response to an instruction, i.e., an input code "G05P10000". When a group of data representing fine amounts of movement held at an address "#10100" is read from data at "#10100" in the header to effect a pulse distribution.

When the pulse distribution of the group of data representing the fine amounts of movement is completed, an input code "G05P10001" is continuously read and a pulse distribution for a group of data representing fine amounts of movement corresponding to this input code is executed. These processes are repeated to execute a pulse distribution of an overall curve.

In particular, treating the group of data representing fine amounts of movement as a common variable of the custom macro enables the group of data representing fine amounts of movement to be stored and read at a high speed without changing the arrangement of the custom macro.

Figure 3:
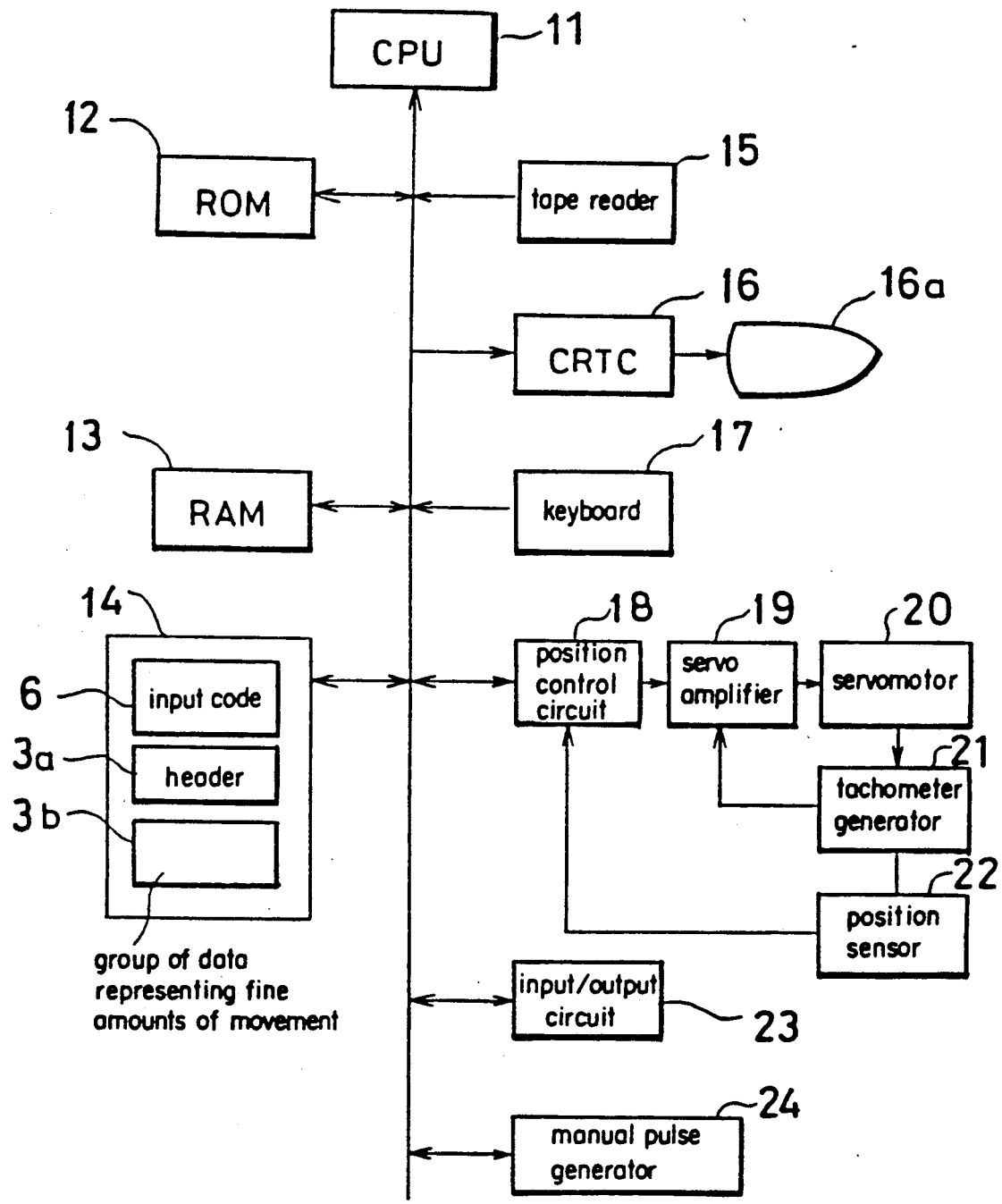
FIG. 3 is a block diagram of an embodiment according to the present invention.

Next, an arrangement of hardware for executing the present invention will be described. FIG. 3 is a block circuit diagram of a numerical control apparatus, wherein 11 designates a processor for controlling an overall system, 12 designates a ROM for storing a control program, 13 designates a RAM for storing various data, and 14 designates a non-volatile memory such as a bubble memory or the like. The non-volatile memory 14 stores, for example, the above input code 6, the header 3a, and the data representing fine amounts of movement 3b.

Reference 15 designates a tape reader used for reading a machining program from a paper tape, 16 designates a display control circuit for converting a digital signal into a display signal, 16a designates a display unit such as a CRT, a liquid crystal display unit or the like, 17 designates a keyboard used for inputting various data, 18 designates a position control circuit for controlling a servomotor, 19 designates a servo amplifier for controlling a speed of the servomotor, 20 designates the servomotor, 21 designates a tachometer generator for feeding back a speed, and 22 designates a position sensor such as, for example, a pulse coder, an optical scale, etc. Note these elements are provided in accordance with the number of shafts, but only the elements for a single shaft are shown for simplicity.

Reference 23 designates an input/output circuit for applying a digital signal to and receiving a digital signal from an external device, and 24 designates a manual pulse generator for moving each shaft in response to the digital signals.

According to the present invention, as described above, data of a curve to be machined by instructions from the custom macro is divided into data representing fine amounts of movement by the operation means in the custom macro and stored before machining and data representing fine amounts of movement are read by an input code for machining while effecting pulse interpolations. Therefore, a pulse distribution for a complex curve can be effected by a numerical control apparatus provided with a usual microprocessor without the need for a special external device and interface.

I claim:

1. A high speed machining method for machining a curve while interpolating pulses at high speed, comprising the steps of:
    (a) dividing first data of the curve into second data representing fine amounts of movement;
    (b) storing headers which represent header addresses of the second data;
    (c) designating the header addresses by a custom macro;
    (d) sequentially reading the second data indicated by the header addresses designated by the custom macro; and
    (e) sequentially pulse-interpolating the second data during a constant time interval.

2. A high speed machining method according to claim 1, wherein said step c) comprises designating the header addresses as a common variable of the custom macro.

3. A high speed machining method according to claim 1, wherein said step c) comprises designating the header addresses as P codes within a G code instruction representing the custom macro.

* * * * *